US010433521B2

(12) United States Patent
Hoolboom et al.

(10) Patent No.: US 10,433,521 B2
(45) Date of Patent: Oct. 8, 2019

(54) VENTILATION VALVE, METHOD AND SYSTEM FOR VENTILATION OF A SPACE FOR ANIMALS OR PLANTS

(71) Applicant: Fancom B.V., Panningen (NL)

(72) Inventors: Wouter Bernardus Lambertus Hoolboom, Panningen (NL); Marcel Leonardus Hubertus Kurstjens, Panningen (NL)

(73) Assignee: FANCOM B.V., Panningen (NL)

( * ) Notice: Subject to any disclaimer, the term of this patent is extended or adjusted under 35 U.S.C. 154(b) by 250 days.

(21) Appl. No.: 15/107,329

(22) PCT Filed: May 12, 2015

(86) PCT No.: PCT/NL2015/050331
§ 371 (c)(1),
(2) Date: Jun. 22, 2016

(87) PCT Pub. No.: WO2015/174832
PCT Pub. Date: Nov. 19, 2015

(65) Prior Publication Data

US 2017/0049070 A1    Feb. 23, 2017

(30) Foreign Application Priority Data

May 13, 2014  (NL) .................................... 2012807

(51) Int. Cl.
*A01K 1/00* (2006.01)
*A01G 9/24* (2006.01)
*F24F 13/14* (2006.01)

(52) U.S. Cl.
CPC .............. *A01K 1/0064* (2013.01); *A01G 9/24* (2013.01); *A01G 9/241* (2013.01); *F24F 13/14* (2013.01); *Y02A 40/264* (2018.01)

(58) Field of Classification Search
USPC ..... 47/17; 119/304–307, 315–317, 448, 493, 119/500; 454/264, 265, 271, 273,
(Continued)

(56) References Cited

U.S. PATENT DOCUMENTS

| | | | | |
|---|---|---|---|---|
| 1,359,360 | A | * | 11/1920 | De Graff ............. F24F 13/1426 454/327 |
| 1,811,467 | A | * | 6/1931 | Gillman, Jr. .......... F24H 9/0052 454/307 |

(Continued)

FOREIGN PATENT DOCUMENTS

EP    0 485 036    5/1992

OTHER PUBLICATIONS

International Search Report for PCT/NL2015/050331 dated Aug. 11, 2015.

*Primary Examiner* — Andrea M Valenti
(74) *Attorney, Agent, or Firm* — Pillsbury Winthrop Shaw Pittman LLP

(57) ABSTRACT

A ventilation valve (1; 101) for ventilation of a space for keeping animals or plants includes an opening-defining circumferential framework (3; 103) for mounting in a wall of that space, and a movable panel (5; 105). The panel (5; 105) is movably attached to the framework (3; 103) for relative movement between a fully closed position, in which substantially no air can pass between the framework and the panel, and a fully open position, in which substantially the complete opening is available for passage of air. A profiled edge on the framework provides a non-linear relation between a passage opening and an opening position of the panel (5; 105). Also provided is a system for ventilating the space, having at least a single ventilation valve, and for
(Continued)

periodically determining parameters of inside air in the space, and adjusting the opening position of the valve based on the parameters.

24 Claims, 8 Drawing Sheets

(58) Field of Classification Search
USPC .................. 454/276–284, 309, 322, 333
See application file for complete search history.

(56) References Cited

U.S. PATENT DOCUMENTS

| | | | | |
|---|---|---|---|---|
| 2,161,001 | A * | 6/1939 | Bedol | E06B 7/02 |
| | | | | 160/104 |
| 2,847,928 | A * | 8/1958 | Glass | F24F 13/075 |
| | | | | 454/309 |
| 3,116,678 | A * | 1/1964 | Hierta | B60H 1/3407 |
| | | | | 454/143 |
| 3,225,679 | A * | 12/1965 | Meyer | F24F 13/08 |
| | | | | 220/326 |
| 4,726,563 | A | 2/1988 | Inglis | |
| 5,520,580 | A * | 5/1996 | Showalter | A01K 1/0064 |
| | | | | 454/273 |
| 9,249,983 | B2 * | 2/2016 | Pagenstert | A01K 1/0064 |
| 2008/0242215 | A1 | 10/2008 | Pagenstert | |
| 2009/0061758 | A1 * | 3/2009 | Yeung | F24F 7/065 |
| | | | | 454/329 |

* cited by examiner

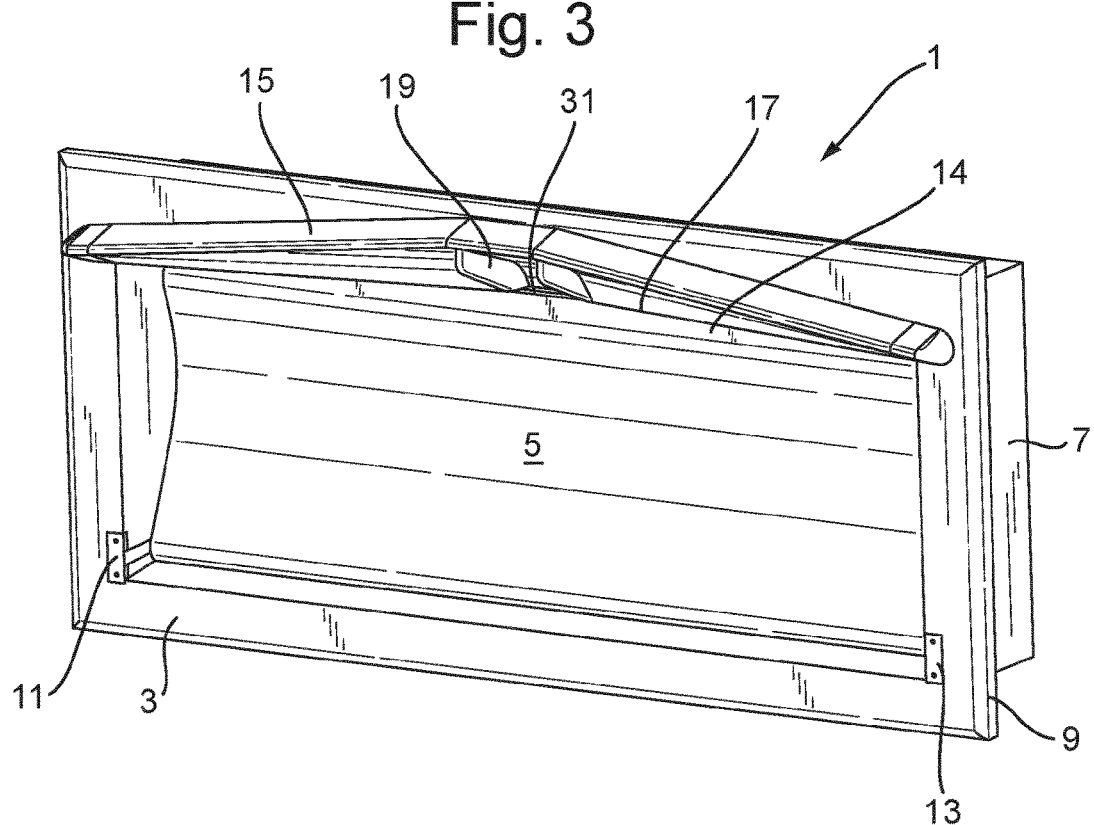
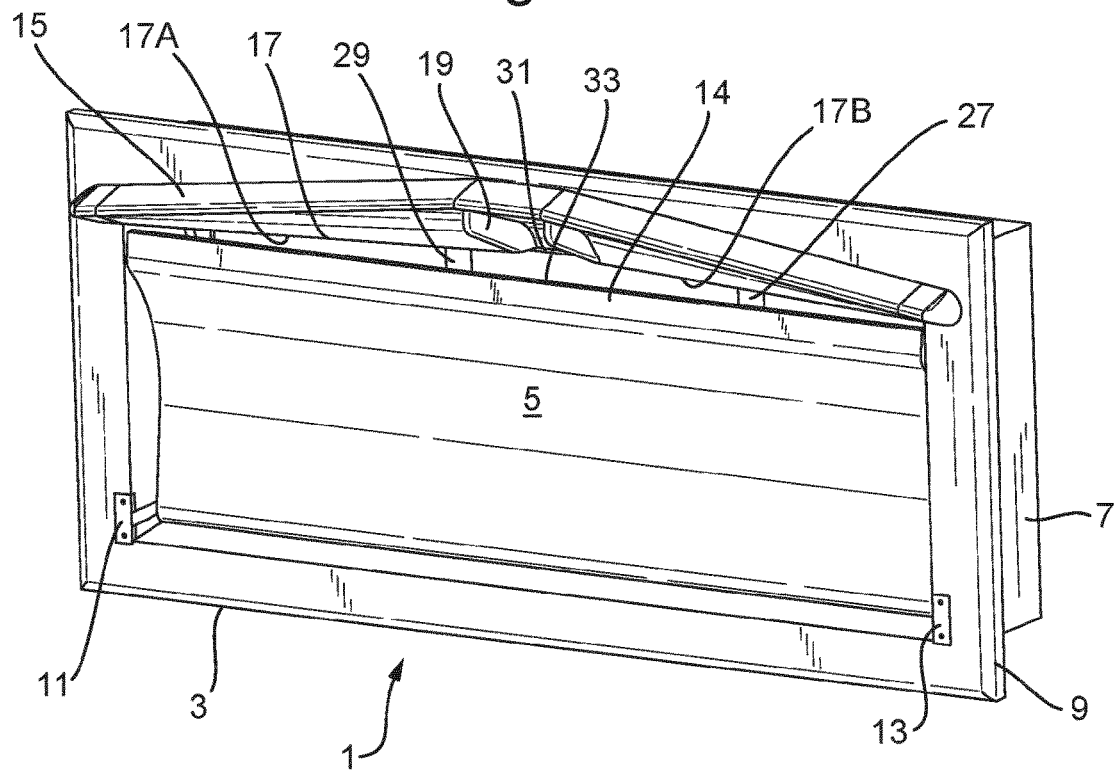

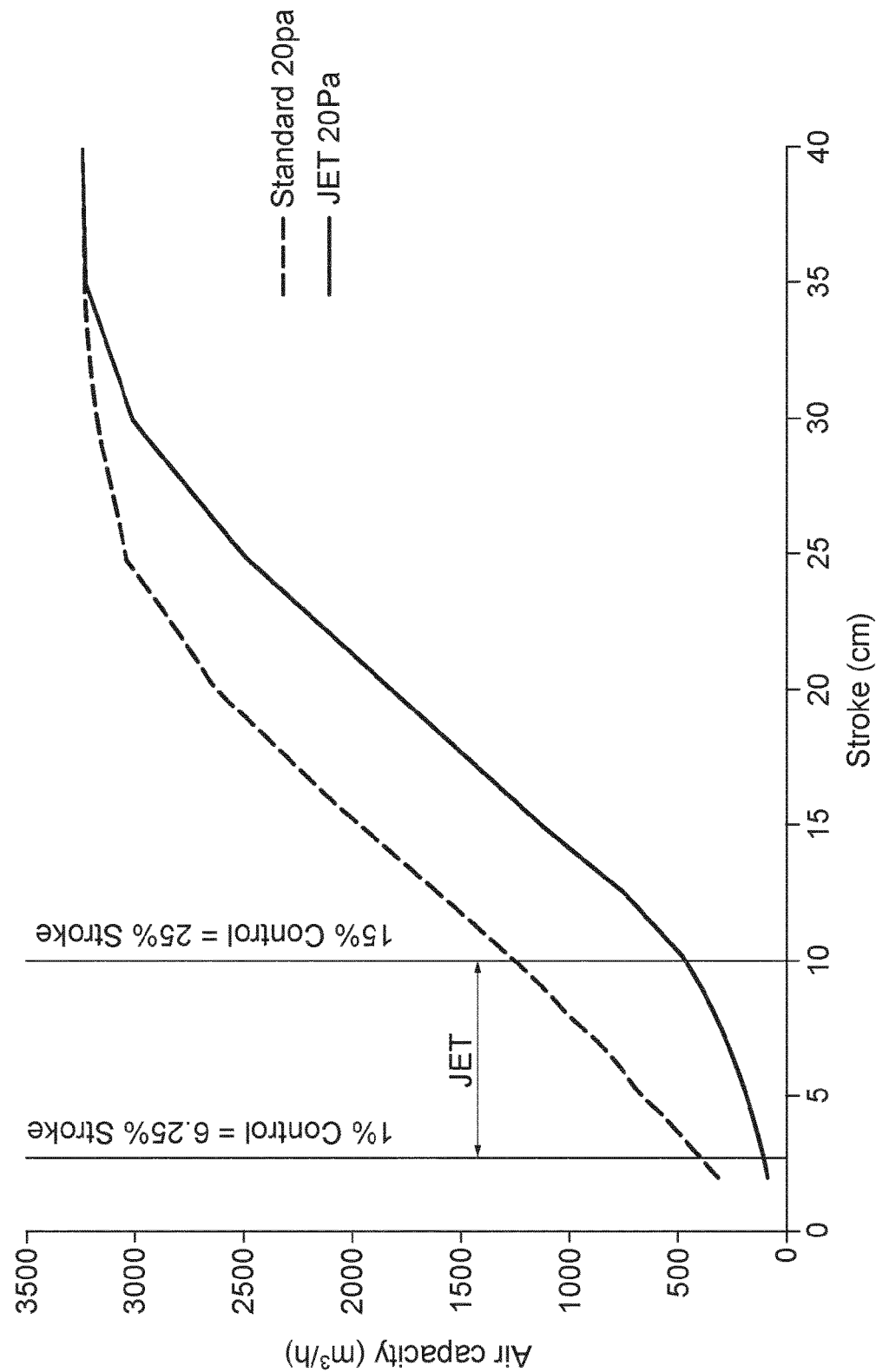

VENTILATION VALVE, METHOD AND SYSTEM FOR VENTILATION OF A SPACE FOR ANIMALS OR PLANTS

CROSS-REFERENCE TO RELATED APPLICATIONS

This is the U.S. National Stage of PCT/NL2015/050331, filed May 12, 2015, which in turn claims priority to Netherlands Application No. 2012807, May 13, 2014, the entire contents of all applications are incorporated herein by reference in their entireties.

This invention relates to a ventilation valve, also referred to as air inlet valve, for ventilation of a space in which animals or plants can be kept. The invention further relates to a method and a system for ventilating such space and also to such space provided with this ventilation system.

In the intensive farming sector, it is common to automatically control the indoor climate of spaces for keeping animals or plants by maintaining or improving properties, such as composition, temperature and/or humidity, of the inside air through supply of fresh air.

It is known from the patent publication EP 0 485 036 A1 to provide a ventilating device for, in particular, an animal housing space with means for generating a reduced pressure in that space and with inlet means for admitting outside air to it. Conventional valves for admitting ventilating air, such as outside air, have insufficient throw in the minimum range, so that cold incoming air warms up insufficiently before the fresh air reaches the spot in the space where the animals or plants are. Further, in conventional air inlet valves, a good controllability of the flow in combination with a good throw in an initial opening range from a fully closed position leaves to be desired. Especially when the flow of the admitted ventilating air is minimal, it is important that the air current has a good throw. This means that the air current has a cross-sectional profile such that the air current does not come to a stop too rapidly, but has sufficient throw to allow it to properly mix with the inside air before reaching the spot in the space where the animals or plants are.

Accordingly, it is an object of the present invention to eliminate at least one of the disadvantages of the prior art or to alleviate the disadvantages thereof. It is also an object of the invention to provide improved, or alternative, solutions that can be implemented in a simpler manner and moreover can be obtained comparatively inexpensively. Alternatively, it is an object of the invention to provide to the public an, at the least, useful option.

To realize these objectives the invention provides inter alia a ventilation valve for ventilation of a space exclusively for keeping animals or plants, the ventilation valve including: an opening-defining circumferential framework for mounting in a wall of the space for keeping animals or plants, and a panel that is movably attached to the circumferential framework to allow it to be moved relative thereto between a fully closed position, in which substantially no ventilating air can pass between the circumferential framework and the panel, and a fully open position in which substantially the complete opening is available for passage of ventilating air, while on the circumferential framework a profiled edge is provided which in an initial opening range between the fully closed position and a predetermined partly opened position provides a non-linear relation between a passage opening for the ventilating air and an associated relative movement position, or opening position, of the panel relative to the circumferential framework. The movably attached panel may be movable relative to the circumferential framework by, for instance, sliding or pivoting.

More particularly, the invention provides a ventilation valve, method and system for ventilation of a space for animals or plants, as defined in one or more of the appended claims.

A practical option is constituted by a ventilation valve in which a nonlinear edge contour of a profiled edge is fully integrally incorporated. This, preferably also wholly insulated, version of the ventilation valve has aerodynamically shaped edges on the inflow side for a higher air output. Further, for a higher air output, there are also partitions arranged having a cross-sectionally elongate aerodynamic oval shape instead of a rectangular cross section. With a nonlinear edge contour integrated in the bordering frame (further also referred to as circumferential framework), the opening behavior (valve characteristic) of a linearly opening ventilation valve can be influenced so that, with the opening being small, a non-linear relation is provided between a passage opening for the ventilating air and an associated relative movement path of the panel relative to the circumferential framework.

The exit angle of the air when the opening of the ventilation valve is smallest (about 1% or less) is defined by a tunnel or jet inlet to be 20° or thereabout. Until approximately 50% opening is reached, the exit angle of the air remains 20°. Also defined by the tunnel or jet inlet is an initial passage opening, which is bundled better for the minimal flow of the admitted ventilating air. Due to the thus-obtained better throw in the minimum range of the air inlet valve, it becomes possible, when refreshment demand is small, to further reduce the amount of incoming air per air inlet valve, from, for instance, currently approx. 250 m$^3$ to approx. 25 m$^3$ at 20 Pa reduced pressure. As a consequence, no air inlet valves need to be set out of operation by manual closure, but all air inlet valves can remain in use at all times, so that the air distribution along the length of the house remains better. The ventilating air can enter, at equal speed, for instance through a specific rectangular cross-sectional opening, of preferably 8×2.5 cm, in a better bundled manner, so that a good throw can be guaranteed.

It is thus of importance that an initial passage opening, which is cleared between the circumferential framework and the panel, has an area that has been brought into a nonlinear ratio to the opening position of the panel and also has a boundary of the passage opening such that an air current with a good throw is ensured.

Further, it is advantageous to make the ventilation valve in the closed position completely airtight to prevent freezing of the moving panel due to leakage air. To that end, the moving panel may be provided all around with "weather stripping" to limit such leakage air.

A particular option is constituted by the provision of a separate top-piece which can be combined with an existing ventilation valve, or one already arranged in an object, possibly not insulated. Also with this top-piece, not only the opening behavior can be made more gradual but also the direction of the air current when the opening is relatively small can be controlled.

This top-piece with a nonlinear edge contour can be offered as an accessory for existing and/or previously installed ventilation valves. These are commercially available in different forms and for every variant an adapted top-piece can be offered. Also in this variant, the exit angle of the air becomes approximately or exactly 20° until an approximately 50% valve opening is reached. With the contours of the free edge of the top-piece according to the invention, a different opening characteristic can be achieved than with the conventional ventilation valves without top-piece.

Also, being able to preserve a rectangular outer shape in the ventilation valves according to the invention is advantageous in installing them in an animal house or like structure.

The invention will now be clarified and elucidated with reference to the appended drawings of examples of embodiments, wherein:

FIG. 3 shows the valve according to FIG. 1, but then in a minimum opened position (1% opening);

FIG. 4 shows the valve according to FIGS. 1 and 3, but then in a somewhat further opened position (15% opening);

FIG. 14 is a graph reflecting the relation between a passage opening for ventilating air and an associated relative movement position, or opening position, of the valve according to the invention in comparison with a valve according to the prior art.

Figure 1:
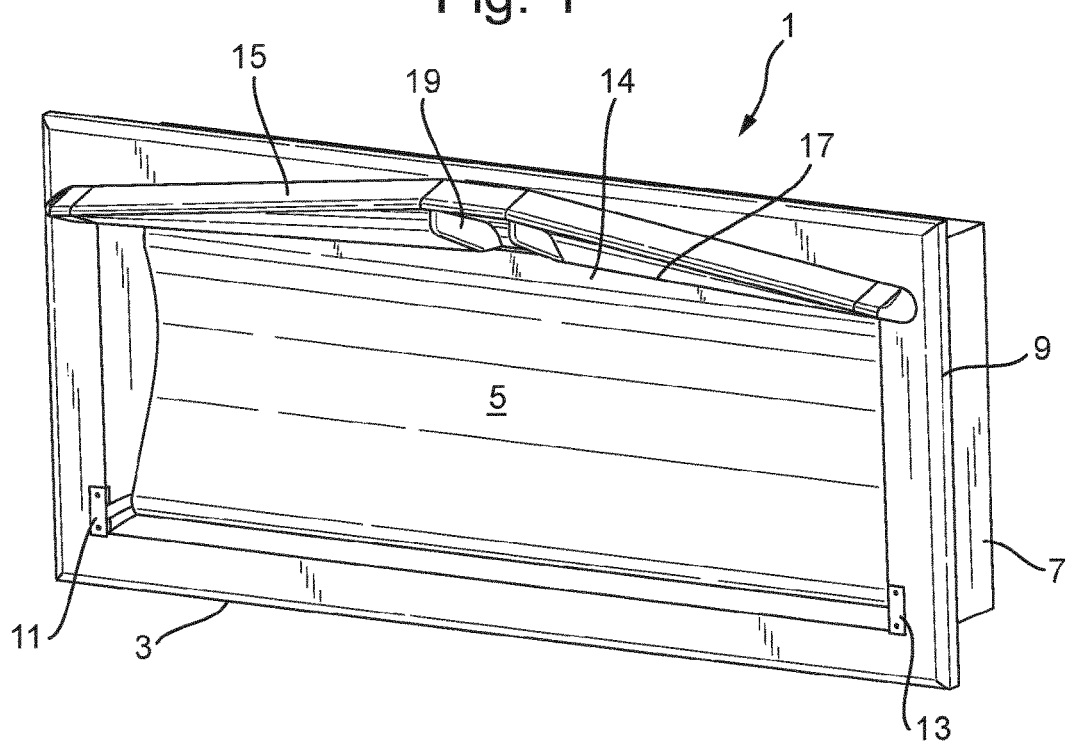
FIG. 1 shows in perspective a ventilation valve according to the invention in a first exemplary embodiment, as seen from an interior of a space to be ventilated (outflow side)

Ventilation valve 1 as shown in FIG. 1 is formed by a circumferential framework 3 which surrounds an opening within which a movable panel 5 is arranged.

This ventilation valve 1 is intended to be used as air inlet valve in for instance animal housing arrangements as described in EP 0 485 036 A1.

Figure 2:
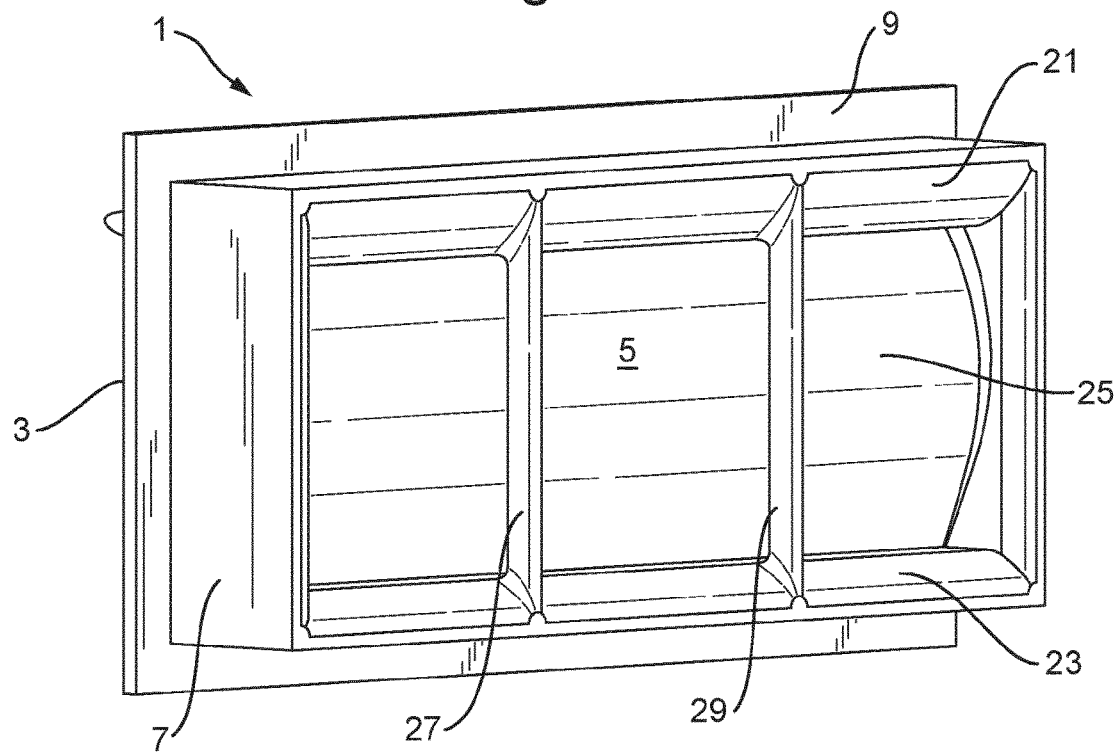
FIG. 2 shows the valve of FIG. 1 as seen from the opposite side (inflow side)

Referring to FIG. 1, there is shown in perspective a front side of the air inlet valve 1, as seen from an interior of a building in which it is intended to be arranged. In FIG. 2 the same air inlet valve 1 is shown from its rear side, that is, the side in use facing towards the outside of the building. The ventilation valve 1 is depicted in FIGS. 1 and 2 in a fully closed position.

The circumferential framework 3 as shown in the FIGS. 1 and 2 is substantially rectangular with two pairs of opposite rectangle sides, and has an insertion part 7 for inclusion in a wall of a building and an outwardly directed flange edge 9 to abut against the inner wall of the building. The panel 5 is hingedly attached along a lower edge to the circumferential framework 3 by means of hinges 11, 13. In the proximity of an upper free edge 14 of the panel 5, an upper horizontal rectangle side of the circumferential framework 3 is provided with a profiled edge 15 extending in the opening direction of the panel 5. Through a nonlinear edge contour 17 thereof the edge 15 adjoins the upper free edge 14 of the panel 5.

This edge contour 17 of the profiled edge 15, integrated into the circumferential framework 3, influences upon opening of the panel 5 the course of clearance of a passage area between the free edge 14 of the panel 5 and the edge contour 17. The effectively cleared passage area is thereby brought into a non-linear relation with the substantially linearly opening panel 5. Further, the profiled edge 15 is provided with a tunnel or jet inlet 19, whose operation will be described in more detail hereinbelow. As can be seen in FIG. 2, the ventilation valve 1, on the inflow side of the insertion part 7, has aerodynamically shaped sidewalls and upper and lower edges 21, 23, by which an inflow opening 25 is bounded. Partitions 27, 29 arranged in this inflow opening 25 are preferably also aerodynamic in shape and then have an oval-shaped transverse cross-section.

In FIG. 3 the ventilation valve 1 is shown in an initially just opened position. The opening position of the panel 5 will be expressed in the following description, as is also customary in practice, as a percentage. A fully closed position of the panel 5, and hence of the ventilation valve 1, then corresponds to an opening position of 0%. A fully opened position then corresponds to an opening position of 100%. The different opening positions of the panel 5 are set by a cable operating system (not shown, but conventional), with the panel 5 spring-biased to the fully closed position (not shown either, but also conventional). Also, for operating the cable system, often a computer-controlled control unit is used which automatically responds to received measuring signals concerning inside air parameters of the space to be ventilated. Such control units are commercially available and are not a subject of the invention described here.

The opening position of the panel 5 relative to the circumferential framework 3 as shown in FIG. 3 corresponds to substantially 1%. In this opening position, an initial passage opening indicated with the reference numeral 31 has arisen between the free edge 14 of the panel 5 and the jet inlet 19. With the aid of the jet inlet 19, it is ensured that, also at a minimal flow of admitted ventilating air, an air current with a good "throw" is obtained. Preferably, the initial jet opening 31, which corresponds to the jet inlet, has a width dimension of between 2 and 3 cm, more precisely 2.5 cm, and a length dimension of between 7 and 10 cm, more precisely 8 cm. As a result, the air current keeps a mass density and concentration such that a substantially laminar air current is obtained. Moreover, by the jet inlet 19 an exit angle for the air current of approximately or exactly 20° is accomplished. Thus, also the minimal air refreshment current is properly mixed before the incoming air reaches the spot in a space where animals or plants are.

In FIG. 4 the panel 5 is again opened further relative to the circumferential framework 3. In this position, a passage opening 33 is bounded by the free longitudinal edge 14 of the panel 5 and the nonlinear edge contour 17. The nonlinear edge contour 17 is more particularly formed by diverging edge parts 17A, 17B extending left and right of the central jet inlet 19. As long as the free longitudinal edge 14 of the panel 5 moves between the positions drawn in FIGS. 3 and 4, the increase of the passage opening 33 will be non-linear with respect to the opening angle of the panel 5. The opening position in FIG. 4 corresponds to 15% of the fully opened position and is at the transition between the non-linear opening range and the further linear opening range of the ventilation valve 1.

Figure 5:
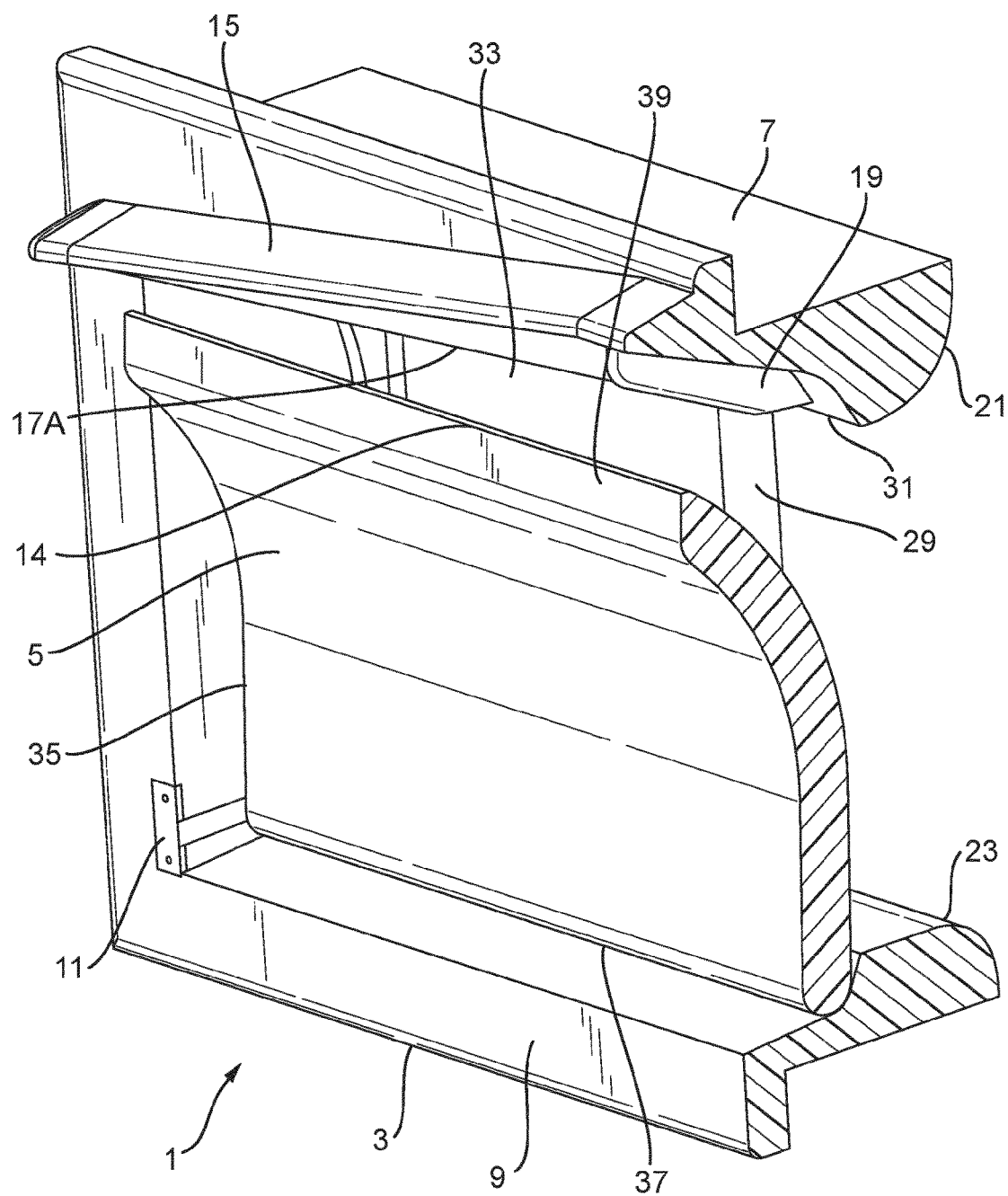
FIG. 5 shows a sectioned half of the valve in the opening position of FIG. 4.

In FIG. 5 a cross section is shown of the ventilation valve 1 with the panel 5 in a partly opened position, as in FIG. 4. In the cross section, it is recognizable that the ventilation valve 1 is manufactured from a thermally insulating plastic material. A suitable material for this is polyurethane, which can be shaped in a mold. This makes it possible to form both the circumferential framework 3 and the panel 5 in a single production step. Assembling them to form a ventilation valve then merely requires the hinges 11, 13 to be fitted. An insulated ventilation valve 1 provides still better possibilities of efficiently controlling the indoor climate of a space in which animals or plants are kept. The reference numerals in FIG. 5 referring to the different elements are the same as described for FIGS. 1-4 and serve for further clarification of the construction. Further, with reference numerals 35, 37 and 39 it is indicated in FIG. 5 where sealings can be provided along the panel 5 to limit leakage air in opening positions between 0% and 15% (the non-linear range). Especially in these limited opening positions, leakage air is unwanted because of the high risk of ice formation and freezing on. As can be recognized in FIG. 5, the vertical edge 35 of the panel 5 is still substantially completely within the circumferential framework 3. A sealing strip 37 on the hinge side of the panel 5 will retain its effectiveness in the non-linear range.

A sealing strip 39 on the upper edge 14 of the panel 5 may also be alternatively arranged on the inside of the profiled edge 15.

Figure 6:
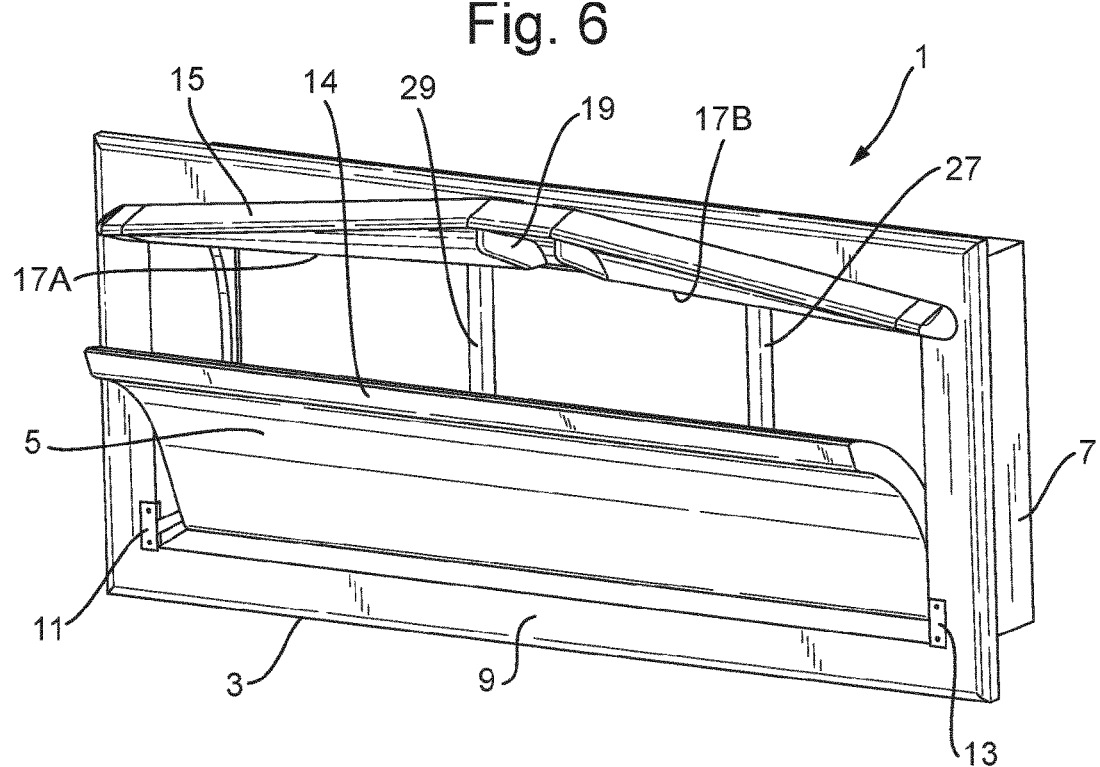
FIG. 6 shows the valve of the preceding FIGS. 1-5 in a half opened position.
Figure 7:
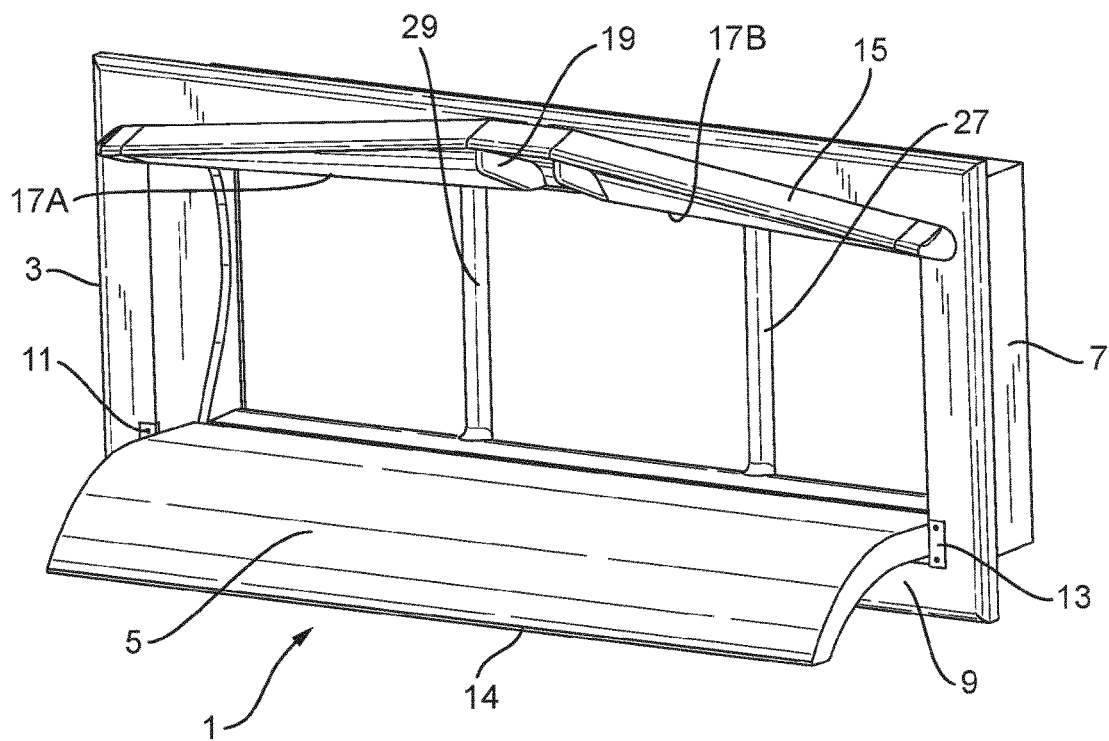
FIG. 7 shows the valve of the preceding FIGS. 1-6 in a fully open position.

The ventilation valve 1 as shown in FIG. 6 represents a half opened position. FIG. 7 next shows the fully opened position. The earlier-discussed reference numerals are again included in FIGS. 6 and 7 for clarification of the construction, but in this connection do not require any further discussion.

Figure 8:
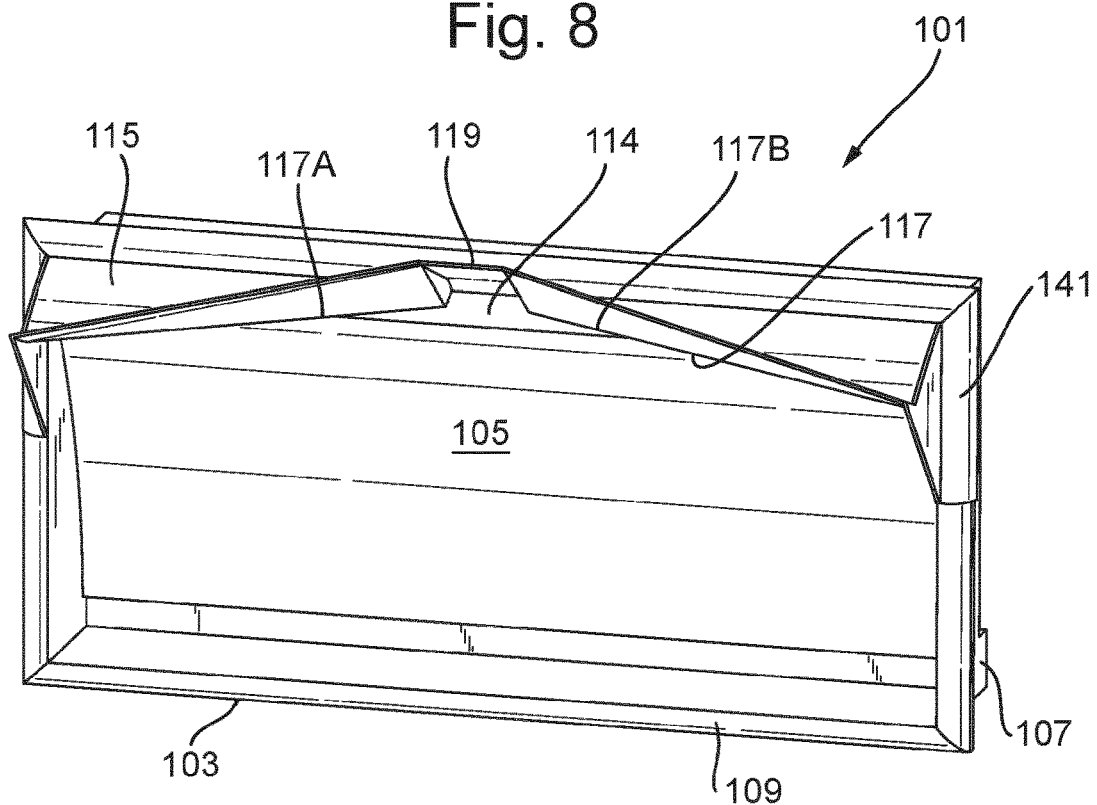
FIG. 8 shows in perspective a ventilation valve according to the invention in a second exemplary embodiment, as seen from an interior of a space to be ventilated (outflow side)
Figure 9:
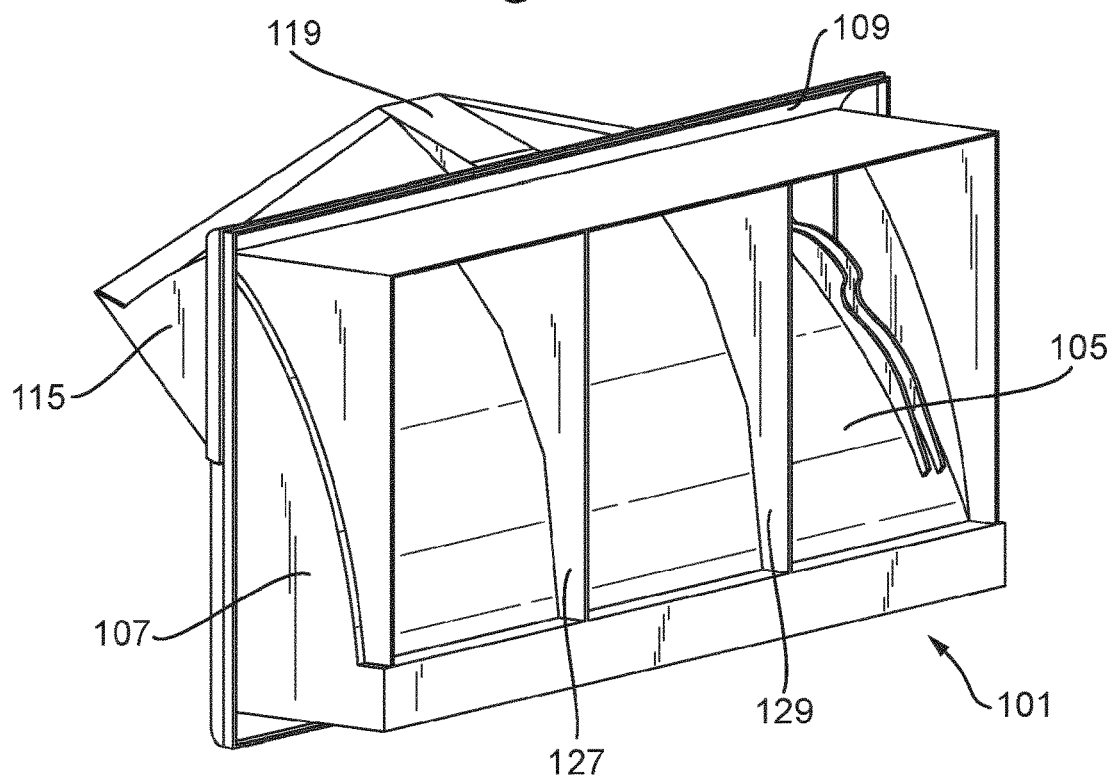
FIG. 9 shows the valve of FIG. 8 as seen from the opposite side (inflow side)

An alternatively implemented ventilation valve 101 is shown in FIGS. 8-13. This ventilation valve 101 is shown in FIG. 8 in the fully closed position as seen from a space to be ventilated. FIG. 9 shows the ventilation valve 101 from the opposite, air inlet side. The ventilation valve 101 shown here is formed by providing a conventional ventilation valve with a separately fitted edge top-piece 115. The conventional ventilation valve is here formed by circumferential framework 103 and hinging panel 105. In connection with this alternative ventilation valve 101, the same reference numerals as in the above-described constructional variant, increased by 100, will be used as much as possible for functionally comparable elements. The edge top-piece 115 is provided with a protruding flange edge 141 which coincides with an outwardly directed flange edge 109 of the circumferential framework 103. The construction is such that the protruding flange edge 141 of the edge top-piece 115 is attachable as airtightly as possible to the upper part of the flange edge 109 of the circumferential framework 103. For this purpose, screws, clips or other suitable fasteners can be used. Also, the conventional part of the air inlet valve 101 is provided with an insertion part 107 for inclusion in the wall of a building that includes the space to be ventilated. The upper and lower edges on the air inlet side, as well as partitions 127, 129 do not have an aerodynamically adapted shape here, but do have a thinnest possible design so as to obstruct the air flowing in as little as possible. Further, it can be seen in FIG. 8 that the edge top-piece 115 by an edge contour 117 thereof adjoins a free edge 114 of the panel 105. The edge contour 117 is again formed by diverging edge parts 117A, 117B on both sides of a central jet inlet 119.

Figure 10:
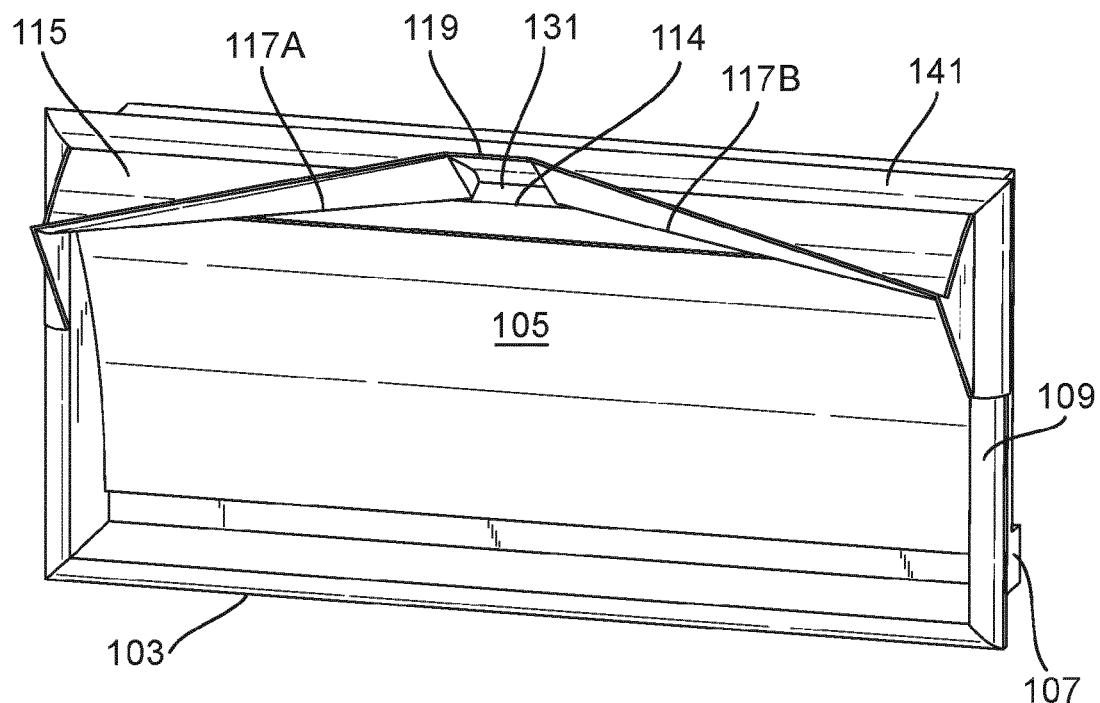
FIG. 10 shows the valve according to FIG. 8, but then in a minimum opened position (1% opening)

In FIG. 10 the ventilation valve 101 is shown with the panel 105 in an initially opened position relative to the circumferential framework 103, corresponding to 1% of the total opening. In this position, an initial jet opening 131 bounded by the jet inlet 119 is cleared by the free edge 114 of the panel 105. The jet inlet 119 may then be so positioned again that the exit angle of the air current again approximates 20°.

Figure 11:
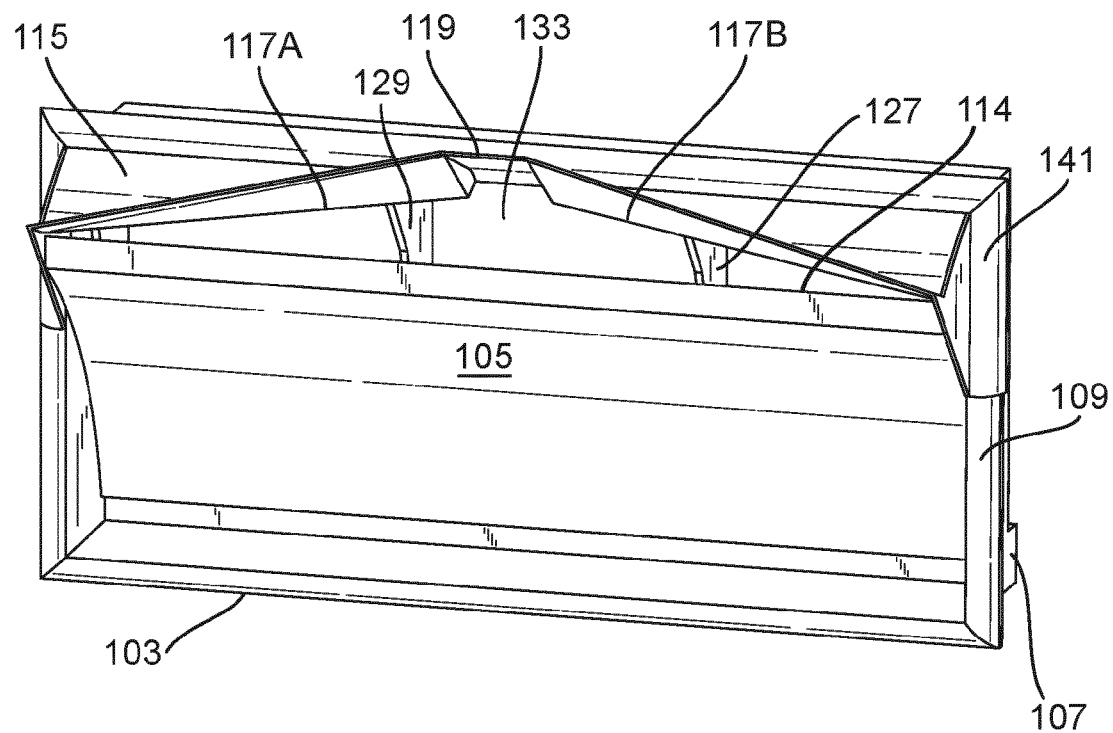
FIG. 11 shows the valve according to FIGS. 8 and 10, but then in a somewhat further opened position (15% opening)

In a further-opened position as shown in FIG. 11, the free edge 114 of the panel 105 has cleared a passage opening 133 that is bounded by the diverging edge parts 117A, 117B, the jet or tunnel inlet 119 and the free edge 114 of the panel itself. This position of the panel 105 corresponds to 15% of the fully opened position and represents the end of the non-linear control range of the ventilation valve 101. The other reference numerals are again included in accordance with FIGS. 8-10 to further clarify the construction.

Figure 12:
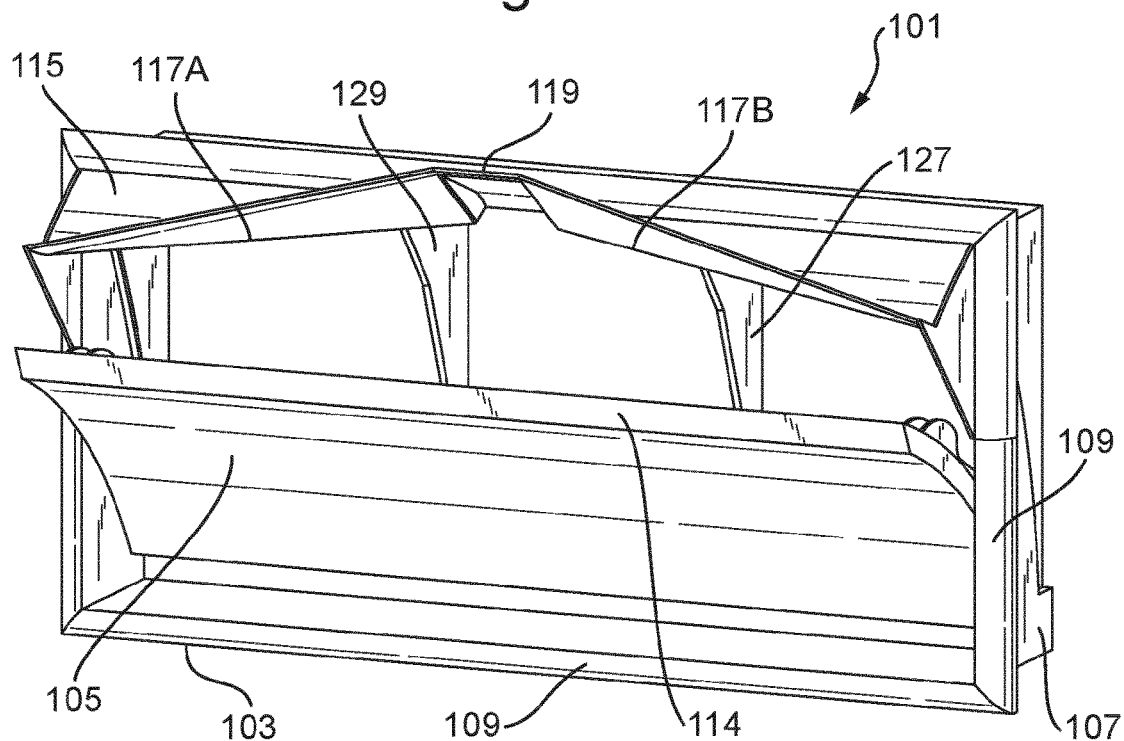
FIG. 12 shows the valve of the preceding FIGS. 8-11 in a half opened position.
Figure 13:
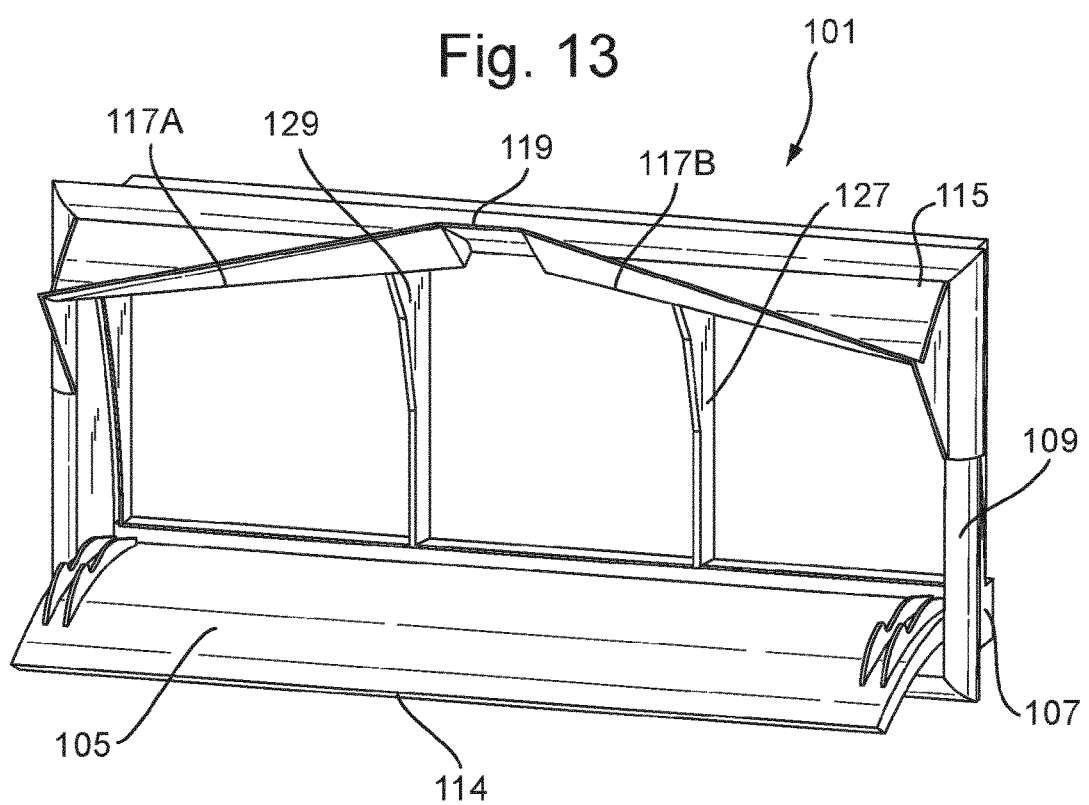
FIG. 13 shows the valve of the preceding FIGS. 8-12 in a fully open position.

The FIGS. 12 and 13 next show the half opened and fully opened positions of the ventilation valve 101. In the alternative ventilation valve 101 described here, the separate edge top-piece 115 has the advantage that it can also be fitted on previously installed conventional ventilation valves.

The effect of the profiled edge, or the profiled edge top-piece, of the above-described constructional variants is illustrated in the graph of FIG. 14. On the horizontal axis of the graph the length displacement in centimeters (cm) is indicated of an operating cable for opening and closing the pivotable panels. This length displacement has a substantially linear relation with the opening position of the panel opened by the operating cable. Plotted along the vertical axis of the graph in FIG. 14 is the air flow capacity in cubic meters per hour ($m^3/h$) of a ventilation valve according to the invention. The dashed line reflects the course of a conventional ventilation valve, while the solid line (designated "JET 20 Pa") reflects the course of the ventilation valve according to the invention. It can be clearly seen that the relation with the opening position of the ventilation valve according to the present invention has an appreciably flatter course in the range between 2.5 and 10 cm displacement. This range, which is designated in the graph with "JET", corresponds to a panel opening position between 1% and 15% and makes it possible, in the case of a minimal air refreshment demand, to control more accurately whilst maintaining a good throw.

It will be clear that for the purpose of setting the opening positions, use can be made of an automatic control system responsive to measuring signals of the parameters measured in the space to be ventilated that are relevant to the desired air climate in that space.

The invention thus provides a ventilation valve (1; 101) for ventilation of a space for keeping animals or plants, including an opening-defining circumferential framework (3; 103) for mounting in a wall of that space, and a movable panel (5; 105). The panel (5; 105) is movably attached to the circumferential framework (3; 103) to allow it to be moved relative thereto between a fully closed position, in which substantially no ventilating air can pass between the circumferential framework and the panel, and a fully open position in which substantially the complete opening is available for passage of ventilating air. Provided on the circumferential framework (3; 103) is a profiled edge which in a range between the fully closed position and a predetermined partly opened position provides a non-linear relation between a passage opening for the ventilating air and an associated relative movement position, or opening position, of the panel (5; 105) relative to the circumferential framework (3; 103). Also provided by the invention is a ventilation system for ventilating a space for keeping animals or plants, having at least a single specimen of the ventilation valve and having means for carrying out the method steps of periodically determining parameters of inside air present in the space, and adjusting the opening position of the ventilation valve on the basis of the determined parameters of the inside air.

The construction and the operation of the invention are believed to be clearly apparent from the foregoing description. However, the invention is not limited to any embodiment described herein and, within the ability of those skilled in the art, changes are possible that are understood to be within the scope of protection. While in the exemplary embodiments described the profiled edge with which the effective passage opening is made non-linear with respect to the opening position of the panel is provided on the circumferential framework, this profiled edge can also be part of a free edge of the movable panel. Further, the above-described exemplary embodiments in each case show a hinging panel. It will be clear to those skilled in the art that a movable panel may also be a sliding panel, as described in the earlier-mentioned document EP 0 485 036 A1. Also in the case of a slidable panel, a profiled edge can be provided on the panel or on the circumferential framework with success.

Also, all kinematic inversions are understood to be within the scope of protection of the present invention. Expressions such as "consisting of", when used in this description or the appended claims, should be construed not as an exhaustive enumeration but rather in an inclusive sense of "at least consisting of". Expressions such as: "means for . . . " should be read as: "component configured for . . . " or "member constructed to . . . " and should be construed to additionally include all equivalents of the structures described. The use of expressions such as: "critical", "advantageous", "desired", et cetera, is not intended to limit the invention. Moreover, also features familiar to those skilled in the art that are not specifically or expressly described or claimed may be additionally included in the construction according to the invention without departing from the scope of protection.

The invention claimed is:

1. A ventilation valve for ventilation of a space exclusively for keeping animals or plants, the ventilation valve comprising:
   a circumferential framework defining a complete opening, for mounting in a wall of the space for keeping animals or plants, and
   a panel movably attached to the circumferential framework to allow it to be moved relative thereto between a fully closed position, in which substantially no ventilating air can pass between the circumferential framework and the panel, and a fully open position in which substantially the complete opening is available for passage of ventilating air,
   wherein on the circumferential framework a profiled edge extending in the opening direction of the panel is provided which in an initial range between the fully closed position of the panel and a predetermined partly opened position thereof provides a non-linear relation between a passage opening for the ventilating air and an associated relative movement position of the panel relative to the circumferential framework, wherein in the initial range, exclusively a jet inlet is cleared, which jet inlet is bound by side edges projecting from the profiled edge such that a jet inflow opening is provided between the side edges, the jet inlet being configured to allow and effect a laminar ventilating flow of air current through the ventilation valve when exclusively the jet inlet is cleared.

2. The ventilation valve according to claim 1, wherein in an initial range of the predetermined partly opened position between approximately 0% and approximately 1% of the fully open position, exclusively a jet inlet is cleared, which is part of the profiled edge and is configured to effect a laminar ventilating air current.

3. The ventilation valve according to claim 2, wherein the profiled edge is provided with an edge contour with edge parts diverging from the jet inlet on both sides.

4. The ventilation valve according to claim 2, wherein the jet inlet is configured to effect an exit angle for the ventilating air current of substantially 20°.

5. The ventilation valve according to claim 2, wherein the jet inlet has an inflow opening having a rectangular cross section with a height/width ratio of 2 to 5.

6. The ventilation valve according to claim 5, wherein the height/width ratio is closer to a value of 3 than to a value of 2 or of 5.

7. The ventilation valve according to claim 6, wherein the rectangular inflow opening has a height dimension of between 2 and 3 cm and a width dimension of between approximately 7 cm and approximately 10 cm.

8. The ventilation valve according to claim 7, wherein the rectangular inflow opening has a height dimension of approximately 2.5 cm and a width dimension of approximately 8 cm.

9. The ventilation valve according to claim 1, wherein the predetermined partly opened position amounts to between approximately 0% and approximately 15% of the fully open position.

10. The ventilation valve according to claim 9, wherein in the range of the predetermined partly opened position between approximately 1% and approximately 15% of the fully open position the non-linear relation between the passage opening and the associated relative movement position of the panel is a parabolic relation.

11. The ventilation valve according to claim 9, wherein in an opening range of the panel above approximately 15% of the fully open position, the relation between the passage opening and the associated relative movement position of the panel is linear.

12. The ventilation valve according to claim 9, wherein the panel in an opening range of the relative movement position between approximately 0% and approximately 15% of the fully open position is sealed all round with respect to the circumferential framework, including the profiled edge.

13. The ventilation valve according to claim 12, wherein the movable panel is provided all round with weather stripping.

14. The ventilation valve according to claim 1, wherein the panel is hingedly connected with the circumferential framework and wherein the relative movement position of the panel relative to the circumferential framework is an opening angle.

15. The ventilation valve according to claim 1, wherein the circumferential framework is rectangular with two pairs of opposite rectangle sides.

16. The ventilation valve according to claim 15, wherein the panel hinges about a hinge axis, which extends parallel to a single pair of the opposite rectangle sides.

17. The ventilation valve according to claim 16, wherein the hinge axis extends in the proximity of a single one of the rectangle sides.

18. The ventilation valve according to claim 1, wherein the panel is spring-loaded for a spring-forced return to the closed position.

19. The ventilation valve according to claim 1, wherein the profiled edge is part of the circumferential framework.

20. The ventilation valve according to claim 19, wherein the profiled edge is implemented as a top-piece which is configured to be fitted to the circumferential framework afterwards.

21. The ventilation valve according to claim 19, wherein the profiled edge is implemented as an integral part of the circumferential framework.

22. A method for ventilating a space for keeping animals or plants, wherein the following steps are carried out:
   providing at least a single ventilation valve according to claim 1,
   periodically determining parameters of inside air present in the space, and
   adjusting the relative movement position of the ventilation valve in response to the determined parameters of the inside air.

23. A ventilation system for ventilating a space for keeping animals or plants, comprising at least a single ventilation valve according to claim 1 and a control unit configured to: periodically determine parameters of inside air present in the space, and adjust the relative movement position of the ventilation valve in response to the determined parameters of the inside air.

24. The ventilation system according to claim 23, wherein the control unit is configured to adjust the relative movement position of the ventilation valve in response to received measuring signals concerning parameters of the inside air.

* * * * *